United States Patent

Heuft et al.

(10) Patent No.: US 11,117,750 B2
(45) Date of Patent: Sep. 14, 2021

(54) TRANSPORT APPARATUS HAVING ROTARY CYLINDER AND CLAMPING BELT

(71) Applicant: HEUFT SYSTEMTECHNIK GMBH, Burgbrohl (DE)

(72) Inventors: Bernhard Heuft, Burgbrohl (DE); Olga Kasdorf, Warburg (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 17/260,412

(22) PCT Filed: Jul. 15, 2019

(86) PCT No.: PCT/EP2019/069034
§ 371 (c)(1),
(2) Date: Jan. 14, 2021

(87) PCT Pub. No.: WO2020/016187
PCT Pub. Date: Jan. 23, 2020

(65) Prior Publication Data
US 2021/0245958 A1    Aug. 12, 2021

(30) Foreign Application Priority Data

Jul. 17, 2018  (DE) .................... 10 2018 005 609.1

(51) Int. Cl.
*B65G 21/20*  (2006.01)
*B65G 47/84*  (2006.01)
(Continued)

(52) U.S. Cl.
CPC ....... *B65G 21/2054* (2013.01); *B65G 47/846* (2013.01); *B08B 9/0835* (2013.01); *B65G 47/2445* (2013.01); *B65G 2201/0244* (2013.01)

(58) Field of Classification Search
CPC .............. B65G 21/2054; B65G 47/846; B65G 47/2445; B65G 2201/0244; B08B 9/0835
USPC ........ 198/457.06, 457.07, 831, 836.1, 468.2, 198/469.1, 473.1
See application file for complete search history.

(56) References Cited

U.S. PATENT DOCUMENTS 10,569,971 B2    2/2020  Lelie et al.
2003/0178284 A1*  9/2003  Steeber ................. B65G 47/52
                                                        198/370.01
(Continued)

FOREIGN PATENT DOCUMENTS

DE       297 16 795 U1   1/1999
DE       29716795 U1 *   1/1999   ......... B65G 47/2445
(Continued)

OTHER PUBLICATIONS

Search Report issued in related application DE 10 2018 005 609.1, dated Feb. 12, 2019, 8 pages.
(Continued)

*Primary Examiner* — Gene O Crawford
*Assistant Examiner* — Lester Rushin, III
(74) *Attorney, Agent, or Firm* — Faegre Drinker Biddle & Reath LLP

(57) ABSTRACT

A transport device for transporting containers having a first transport section configured to convey containers in and a second transport section configured to convey containers out. The transport device includes a transfer device having a rotary cylinder, a clamping belt and a compensation device. The clamping belt can be adjusted in the area of the transfer device. The rotary cylinder and/or the clamping belt are configured to be drivable. The rotary cylinder and the clamping belt are configured to hold the containers between the rotary cylinder and the clamping belt and to transfer them from the first transport section to the second transport section. The rotary cylinder has one or more container
(Continued)

support rings and at least one belt support element, wherein the belt support element is arranged such that the clamping belt abuts against it when there are no containers on the transfer device.

14 Claims, 13 Drawing Sheets

(51) Int. Cl.
    *B65G 47/244*     (2006.01)
    *B08B 9/08*       (2006.01)

(56)              References Cited

U.S. PATENT DOCUMENTS

2007/0068774 A1    3/2007   Giometti et al.
2011/0108389 A1    5/2011   Bonnain

FOREIGN PATENT DOCUMENTS

| DE | 10 2006 042 598 A1 | 4/2007 | |
|---|---|---|---|
| DE | 10 2013 209 451 A1 | 11/2014 | |
| DE | 10 2016 103 845 A1 | 9/2017 | |
| FR | 1 171 558 A | 1/1959 | |
| GB | 1292378 A * | 10/1972 | ......... B65G 47/2445 |
| JP | S61-069617 A | 4/1986 | |

OTHER PUBLICATIONS

Search Report issued in related application PCT/EP2019/069034, dated Oct. 24, 2019, with English language translation, 5 pages.
International Preliminary Report on Patentability issued in related application PCT/EP2019/069034, with English language translation, dated Jan. 19, 2021, 14 pages.

* cited by examiner

TRANSPORT APPARATUS HAVING ROTARY CYLINDER AND CLAMPING BELT

CROSS-REFERENCE TO RELATED APPLICATIONS

This application is the U.S. national phase of the International Patent Application No. PCT/EP2019/069034 filed Jul. 15, 2019, which claims the benefit of German Patent Application No. 10 2018 005 609.1 filed Jul. 17, 2018, the entire content of which is incorporated herein by reference.

FIELD

The disclosure relates to a transport device for transporting containers. The transport device comprises a first transport section which is configured to convey the containers in and a second transport section which is configured to convey the containers out. The transport device further comprises a transfer device with which the containers are conveyed from the first transport section to the second transport section.

BACKGROUND

It is known to arrange a pair of clamping belts opposite each other in a container inspection device and to convey containers between the clamping belts. DE 297 16 795 U1, for example, discloses such a belt drive. This belt drive can be used to perform a pressure or leak test of containers. For this purpose, the containers are guided on a conveyor belt and put under pressure by the laterally running belts.

A belt drive can also be used to inspect containers from above and below. In this case the container is transferred from a first transport section to a second transport section by the belt drive. Between the two transport sections, the container is only held by friction, which is generated by the force of the belts on the container. The container can then be inspected from above and especially from below.

In this type of belt drive, the belts are guided over contact strips, with which the required contact pressure on the container is generated. However, these devices have the disadvantage that there is relatively high friction between the back of the drive belts and the contact strips, which has a negative effect on the service life of the drive belts.

Furthermore, it is known to provide a star wheel to change the direction of transport. A star wheel has the disadvantage that the star wheel cannot be operated with variable speed, but the speed of the star wheel must match the conveying speed of the containers. Furthermore, a star wheel cannot be used variably for different bottle sizes. Therefore, format parts are currently being used to adapt the holders of a star wheel to the different bottle sizes. If the containers to be conveyed are changed, the format parts must be changed manually. This means that changing the container format always involves relatively laborious conversion measures.

SUMMARY

Disclosed embodiments are based on the task of developing a transport device of the type mentioned above in such a way that a change of direction of the transported containers can be carried out in an optimized way and a container inspection, in particular a bottom inspection, can be carried out at the same time. A further task of the disclosed embodiments is to provide such a transport device which has an increased service life compared to conventional transport devices. A further task of the disclosed embodiments is also to provide a transport device which can be adapted as easily as possible to different container sizes. Surprisingly, it has even turned out that the disclosed embodiments can be used not only for containers with a round cross-section, but also for containers with an angular or elliptical cross-section. Due to the elasticity of the clamping belt and the flexibility of the transport system, even differently shaped or differently sized containers can be conveyed simultaneously on the transport device.

A further task of the disclosed embodiments is to provide a transport device of the above-mentioned type, in which containers can be transported at irregular intervals and, in particular, filling and emptying can be carried out with low friction loss.

According to the disclosed embodiments, a transport device for the transport of containers is provided. The transport device comprises a first transport section, which is configured to convey the containers in and a second transport section, which is configured to convey the containers out. The transport device further comprises a transfer device. The transfer device comprises a rotary cylinder, a clamping belt and a compensation device. The rotary cylinder and/or the clamping belt are configured driveable. The compensation device is configured in such a way that the length of the clamping belt can be adjusted in the area of the transfer device with it. The rotary cylinder and the clamping belt are configured to hold the containers between the rotary cylinder and the clamping belt while transferring them from the first transport section to the second transport section. The rotary cylinder has one or more container support rings and at least one belt support element. The belt support element is arranged in such a way that the clamping belt abuts against it when there are no containers on the transfer device.

The containers are transported by the rotary cylinder between the first transport section and the second transport section on a transfer device with curved transport section. On the curved transport section, the containers are clamped between the clamping belt and the rotary cylinder. Because the containers are clamped between the clamping belt and the rotary cylinder, the containers do not have to be conveyed standing on a conveyor belt or held otherwise. The clamped containers are guided through the curved transport section in a suspended state.

Preferably, the first transport section and the second transport section are arranged at an angle to each other. The transfer device is configured to give the containers the necessary change of direction to transfer them from the first to the second transport section.

By means of the transport device a container inspection can be realized. The container inspection is preferably carried out in the area of the curved transport section, i.e. in the area where the containers are clamped between the clamping belt and the rotary cylinder. The container inspection is for example a bottom inspection, an empty bottle inspection, a pressure or tightness test, a fill level control, a cap control or a label seat control. According to an embodiment, containers can be transported continuously and at variable speed through the transport device.

In particular, the containers can be transported in loose sequence and/or with varying distances between them. It is therefore not necessary to bring the containers to a predetermined distance from each other, as is still necessary with conventional star wheels.

In addition to a container inspection, a change of direction can be realized simultaneously due to the curved transport section. The change of direction is preferably a change of direction of 90°. However, it is also conceivable to make a smaller or larger change of direction. For example, a change of direction of 180° can be carried out so that containers are transported away in the opposite direction to the initial entry direction after having passed through the transport device. A larger change of direction results in a longer curved transport section, which in turn extends the distance on which a container inspection can be carried out.

Disclosed embodiments can also be used in connection with a more complex system of several inspection devices. During a sidewall inspection it is often necessary to inspect the bottles from different directions. According to disclosed embodiments, for example, a first sidewall inspection can be carried out in the area of the first transport section on which the containers are conveyed in and a second sidewall inspection can be carried out in the area of the second transport section on which the containers are conveyed out. During the intermediate transport on the transfer device, the container is then turned by a predetermined angle, e.g. 90°, and a bottom inspection can be performed on the other side. In addition to this, further inspections such as mouth inspection or residual alkaline detection can be carried out. Due to the curved transport section of the transport device, it is possible to deviate from the conventionally usual linear design of such inspection systems, thus reducing the required overall length of inspection systems. In general, this also allows a more flexible construction and possibly a more compact design of inspection systems.

As already mentioned above, the change of direction and thus the dwell time of the containers can be adapted to the respective transport task. The extended dwell time in the transport device can also be used advantageously for leak testing of deformable, filled containers, such as filled plastic bottles or metal cans, in which the internal pressure of the container is increased by lateral pressing and the container condition is determined on the basis of the developing counterpressure. The longer the contact pressure is applied to the container, the longer the time over which the internal pressure can build up and the more precise the leak test can be carried out. The dwell time of the containers in the transfer device also depends on the wrap angle of the clamping belt. The wrap angle can basically be selected as desired and can preferably be 90, 180 or up to 330° of the circumference of the rotary cylinder.

The greater the wrap angle of the clamping belt, the greater the danger that the clamping belt will come into contact with the rotary cylinder if the transfer device is underfilled and undesirable frictional losses occur. To avoid such frictional losses, according to disclosed embodiments, the rotary cylinder is equipped with one or more container support rings and at least one belt support element. The belt support element is arranged in such a way that the clamping belt abuts against it when there are no or too few containers on the transfer device.

The rotary cylinder can have at least one container support ring and one belt support element in the form of a belt support ring. Preferably, the rotary cylinder can have an upper container support ring and a lower container support ring, whereby a set back and, if necessary, freely rotatable belt support ring is arranged between the container support rings, and wherein the width of the clamping belt is smaller than the distance between the container support rings. The arrangement and number of the container support rings and the belt support rings can thereby be adapted to the shape and number of the clamping belts used. Further preferred embodiments of the rotary cylinder are, for example, a central container support ring arranged between two belt support rings or a rotary cylinder with several alternately arranged container and belt support rings.

In this way, damage to the transport device is avoided. If no containers are transported by the transport device, there is otherwise a risk that the clamping belt will rest on the outer circumference of the rotary cylinder. If, in addition, both the clamping belt and the rotary cylinder are actively driven, the situation could arise that unwanted friction occurs between the clamping belt and the rotary cylinder. This can be prevented by the set back belt support ring.

When containers are transported through the transport device, these containers only contact the at least one container support ring of the rotary cylinder and the clamping belt. In this case, the clamping belt is in contact with the transported containers and the containers in between prevent the clamping belt from contacting the rotary cylinder. If no containers are transported by the transport device, the clamping belt contacts the rotary cylinder. However, unwanted friction can be prevented by the clamping belt only contacting the belt support ring located between the upper and lower container support ring. For this purpose, the clamping belt has a width that is smaller than the distance between the upper and lower container support ring.

Preferably, the upper container support ring and the lower container support ring are driveably mounted, wherein the belt support ring is mounted freely rotatable. The belt support ring must be set back at least so far that the containers to be transported do not come into contact with the belt support ring during normal operation. At the same time, however, the diameter of the belt support ring should not be chosen too small, as otherwise the required length of the leading strand of the clamping belt varies too much between an empty and a filled transfer device, which makes regulation of the clamping belt length difficult.

In this way, containers which are transported through the transport device can be driven by the drivable container support rings. At the same time, undesired friction or even damage to the transport device is prevented if no containers are transported through the transport device. In this case, the clamping belt only contacts the belt support ring of the rotary cylinder. Due to the fact that the belt support ring is mounted freely rotatable, the belt support ring can move with the drive speed of the clamping belt.

In a further embodiment, the rotary cylinder can have at least one container support ring and a belt support element in the form of at least one extendable support device. Preferably the rotary cylinder can have an upper container support ring and a lower container support ring, wherein the at least one extendable support device is arranged between the container support rings, and wherein the width of the clamping belt is smaller than the distance between the container support rings. As described above in connection with the belt support rings, the rotary cylinder can also have extendable support devices at different vertical positions between the different container support rings.

The at least one extendable support device comprises a support roller on which the clamping belt can roll and an adjusting element with which the support roller can be radially positioned. If there are no containers on the transfer device, the adjusting element is extended over the circumference of the container support rings so that the clamping belt is guided over the support roller and has no contact with the container support rings. As soon as there are containers on the transfer device and thus there is no longer any danger of the clamping belt touching down on the container support rings, the support roller is retracted.

Depending on the wrap angle, one or several supporting devices can be provided, preferably evenly distributed over the length of the transfer device. The support devices can be arranged stationary with respect to the rotary cylinder. The support rollers can also be arranged in such a way that they rotate with the rotary cylinder.

Preferably the adjusting elements of the support devices are motor, pneumatic or hydraulic adjusting elements with which the support rollers can be moved in radial direction with respect to the rotary cylinder. In particular, electromotor linear drives can be used for this purpose.

The embodiment with radially adjustable support devices is particularly flexibly adaptable to the respective transport task. Especially at the infeed of the first containers onto the transfer device, the angle between the clamping belt and the rotary cylinder can be adjusted by the radial position of the first support roller, so that the first containers are optimally guided onto the transfer device. The same applies to the outfeed of the last containers from the transfer device. Furthermore, with this embodiment, the length of the leading strand of the clamping belt for an empty transfer device is about as long as for a filled transfer device. This makes it easier to adjust the belt tension and the required length of the leading strand respectively, especially when starting or filling the transfer device, as only small force jumps or small length changes are required.

But also in case of irregular distances between the containers to be transported, a contact of the clamping belt with the rotary cylinder can be prevented by means of the supporting device. If larger gaps between the containers are detected, the support devices can be extended for a short time so that the clamping belt does not touch the rotary cylinder. This also can reduce the danger of belt wear due to unnecessary friction between the clamping belt and the rotary cylinder.

A single or several clamping belts can be used, arranged parallel and one above the other. If necessary, containers can be transported more stable with several clamping belts, for example two or three clamping belts arranged in parallel. If two or more clamping belts are used, of course several belt support rings and several container support rings can be used accordingly.

It is also possible that several clamping belts are arranged one behind the other, wherein, for example, a first clamping belt is provided in a first peripheral area of the transfer device and wherein a second clamping belt is provided in a second peripheral area of the transfer device. In particular, if the transfer device forms a wrap angle of 180° or more of the circumference of the rotary cylinder, it may be useful to use several clamping belts arranged one behind the other to avoid friction or to distribute the contact pressure.

Clamping belts arranged one behind the other in the transport direction can be operated at the same speed to ensure continuous and uniform container transport. However, it is also possible to operate clamping belts arranged one behind the other at different speeds. Since the rotary cylinder always moves at the same speed, a speed difference between the clamping belts results in the containers being rotated at different speeds in the respective transport sections. This can be used, for example, for foreign object inspection to differentiate between defects on the container wall and foreign objects inside the container. The clamping belt can be made of any suitable material. Preferably, the clamping belt can be a plastic or rubber product. Preferably, the clamping belt can consist of polyurethane elastomer and/or contain a polyamide fabric. The clamping belts can be made in different degrees of hardness.

The clamping belt can be made up of several parts and can, for example, have a carrier layer provided with metal reinforcements, onto which the contact area of the clamping belt is glued. Preferably the clamping belt is an endless belt.

To avoid deformations of the clamping belt in the area of the deflections, the clamping belt is preferably incised at the front. The shape of the incisions can have any geometry known to a skilled person.

As already mentioned, containers of any shape can be transported with the present transport device. However, the containers are preferably cylindrical and have a diameter of 50 to 100 mm. The diameter of the rotary cylinder or the container support rings respectively can be selected according to the diameter of the containers to be transported and is in principle freely selectable. Preferably, the rotary cylinder can have a diameter of between 25 and 200 cm.

The container support rings can consist of any suitable material and can be intended for transporting the containers to be transported in direct contact with the container support rings in the transfer device.

The running surface of the container support rings of the rotary cylinder can also be provided with a protective band. The protective band can advantageously be made of an elastic plastic. The protective band reduces or avoids wear of the container support rings and can be replaced relatively easily. The frictional properties of the protective band can also be optimally adapted to the containers to be transported.

The protective band can also be guided over an additional roller outside the transport section of the transfer device. This additional roller can be used to vary the tension of the protective band via the rotary cylinder. In addition, this additional roller can also be driven and can therefore also be used as a drive element for the rotary cylinder.

The clamping belt or the clamping belts are advantageously tensioned via two deflection rollers each. The deflection rollers can have a suitable diameter in this case, preferably a diameter of 10 to 25 cm. The clamping belt must be tensioned over the deflection rollers in such a way that the incoming containers are picked up between the clamping belt and the rotary cylinder and then remain securely clamped between the clamping belt and the rotary cylinder during transport on the transfer device. During operation, the belt tension should be kept essentially constant. The required effective length of the leading strand of the clamping belt can change during operation and depends especially on how many containers are currently transported on the transfer device.

To prevent the leading and returning strand of the clamping belt from rubbing against each other, one or more supporting elements can be provided, over which the returning strand of a clamping belt is guided. Especially with directional changes of more than 90°, there is the danger that the returning strand of the clamping belt runs against the inner leading strand of the clamping belt, which in turn leads to undesired friction.

These additional support elements can be, in particular, one or more support rollers over which the returning strand of the clamping belt is guided. Depending on the length of the transfer section, one or more such support rollers can be provided.

The transport device according to disclosed embodiments also has a compensation device with which the belt length of the leading strand of the clamping belt can be adjusted. The belt length of the leading strand of the clamping belt is the length of the clamping belt in the area of the transfer device, i.e. in the area where the containers are held clamped between the rotary cylinder and the clamping belt. The length of the clamping belt required in this area depends on the number of containers currently transported on the transfer device, and increases with the number of containers currently transported on the transfer device.

The compensation device can comprise one or more compensation elements, which are arranged inside the clamping belt, i.e., between the deflection rollers within the path defined by the circulating clamping belt or belts.

The belt length of the leading strand of the clamping belt can be adjusted with the compensation elements depending on the number, shape and/or size of the containers to be transported on the transfer device.

Preferably, the compensation element is configured to contact the returning strand of the clamping belt and to be adjusted against it in a direction away from the rotary cylinder.

If the number of containers transported on the transfer device changes, the effective length of the leading strand of the clamping belt can be easily changed via the compensation element.

Preferably, the compensation element includes an adjusting device with which a support roller can be adjusted against the returning strand of the clamping belt. The compensation element can be a motor-driven, a mechanical, a pneumatic or a hydraulic adjusting device. In particular, a motor-driven adjusting device can include an electric linear drive. If several support rollers are used, all or any number of the support rollers can be equipped with an adjusting device.

The main purpose of the compensation device is to adapt the required length of the leading strand of the clamping belt to the current transport situation on the transfer device. At the same time, however, the compensation device ensures that the belt tension remains constant during operation. This ensures that the containers are always pressed against the rotary cylinder with a specified contact pressure and held securely.

The at least one compensation element of the compensation device is preferably adjusted in such a way that the associated support roller is adjusted with a constant pressure against the returning strand of the clamping belt. If the required length of the leading strand of the clamping belt changes, the position of the support roller is moved by the compensation element so that the leading strand is lengthened or shortened accordingly with constant belt tension. Depending on the dimensions of the transfer device, length changes of up to several decimetres can occur. The one or, if necessary, more compensation elements of the compensation device must therefore be able to cope with correspondingly long paths of motion and the associated length changes.

By providing the compensation device, the distance between the deflection rollers of the clamping belt can remain unchanged. In addition, a pressure or leak test can be carried out in an optimised way by providing the compensation device, as the pressure exerted on the containers to be transported can be optimally adjusted by adjusting the tension of the clamping belt.

With large wrap angles, it may happen that the leading strand of the clamping belt swings around its specified vertical position during operation, since the clamping belt is only guided by the two deflection rollers at the infeed and outfeed end of the transfer device. Especially if containers slip down in the area of the transfer device, they can also displace the clamping belt downwards. An additional guiding device can therefore be provided to better control the vertical position of the leading strand of the clamping belt.

This guiding device can have at least one guide roller, which is pre-tensioned against the rear side of the leading strand of the clamping belt by means of an associated adjusting device. The roller is thereby preferably in the form of a cylindrical disc spool and has protruding boundaries at its end faces between which the clamping belt is guided. These boundaries of the end faces should protrude far enough to allow the clamping belt to be guided safely between them, but must not protrude so far that they extend beyond the clamping belt and come into contact with the containers to be transported.

Due to the adjusting device, it is ensured that each guide roller always follows the current position of the clamping belt and thus always abuts against the rear side of the leading strand of the clamping belt. The boundaries of the end faces of the guide roller then ensure that the clamping belt is held in the vertical position specified by the guide roller. The number of guiding devices is freely selectable and can be oriented to the length of the transfer device. Preferably the guiding devices are evenly distributed over the length of the transfer device.

Preferably the outer circumference of the rotary cylinder is formed in a uniform circular shape. According to this aspect, the rotary cylinder can transport a large number of containers at the same time without the transport capacity of the rotary cylinder being dependent on the infeed rate of the containers to be transported. In particular, the rotary cylinder is not configured as a star wheel, which can only be operated at a specific drive speed and a specific feed rate of the containers to be transported.

Preferably, the rotary cylinder and the clamping belt are configured to be driveable, wherein the speeds of the rotary cylinder and the clamping belt can be adjusted independently of each other.

The clamping belt and the rotary cylinder can be driven in such a way that containers can be transported between the clamping belt and the rotary cylinder without unwanted container rotation. In this case, the drive speed of the clamping belt is preferably selected slightly higher than the circumferential speed of the rotary cylinder in accordance with the curvature of the curved transport section.

The drive speed between the clamping belt and the rotary cylinder can also be deliberately varied so that a certain rotation of the containers takes place, which are transported between the clamping belt and the rotary cylinder. In this way, a container inspection, in particular a pressure and leak test of the containers, can be optimised, as a possible leakage point of a container due to rotation is not permanently covered by the pressed-on clamping belt and the pressed-on rotary cylinder. Preferably, containers to be inspected are rotated by about 90 degrees while they pass through the transport device. An optical inspection of containers can also be optimised by a certain rotational movement, since in this case the containers can be inspected from several sides.

The drive of the clamping belt as well as the rotary cylinder can be realised by any motor. Synchronous motors, preferably permanently excited synchronous motors, are particularly suitable in this context.

The drive of the rotary cylinder is preferably integrated into the axis of the rotary cylinder. An external rotor motor is preferably used as the drive, which is configured as part of the speed cylinder. This reduces the constructive effort for driving the rotary cylinder. In addition, space is saved, as no motor and drive elements need to be provided above and below the rotary cylinder. As mentioned above, the drive of the rotary cylinder can also be effected via a protective band, which is tensioned over the container support rings and a drive roller provided outside the transport section.

The drive of the clamping belt is preferably arranged in one of the two deflection rollers, around which the clamping belt is tensioned. Here too, an external rotor motor can be used as the drive. The external rotor motor can preferably form the deflection roller. This preferably increases the space available for the positioning of an inspection device. The use of external rotor motors integrated in the rotary cylinder or the deflection rollers not only saves space, but also makes the transport device generally more accessible, which facilitates the maintenance and operation of such transport devices, for example.

If only one of the deflection rollers is driven, the drive is preferably located in the deflection roller, which is located downstream in the transport direction of the containers to be transported. This ensures that the leading strand of the clamping belt is always tightened.

Even better control of the belt speed can be achieved by driving both deflection rollers. Especially if there are no containers on the transfer device yet, the speed of the clamping belt can also be adjusted electronically to the circumferential speed of the rotary cylinder in such a way that there is no friction between the clamping belt and the rotary cylinder. In this case, the rotary cylinder does not necessarily have to have a belt support ring.

If the rotary cylinder does not have a belt support ring, there is the danger that the clamping belt comes into contact with the rotary cylinder at least in sections, especially when the first containers enter the transfer device and when the last containers leave the transfer device. Due to the surface properties and the tension of the clamping belt, considerable frictional forces can occur in this case, which considerably impair the function of the transfer device. In these situations it may therefore be necessary to adjust the speed of the rotary cylinder and the speed of the clamping belt to each other. More precisely, the circumferential speed of the rotary cylinder must be controlled so that it corresponds to the belt speed of the inside of the clamping belt, i.e. the side of the clamping belt that comes into contact with the containers or the rotary cylinder.

But even if there are already containers on the transfer device, the transport on the transfer device can be optimised by varying the drive speeds. By varying the drive speeds of the deflection rollers, the available length of the leading strand of the clamping belt can also be temporarily changed. If the deflection roller at the upstream infeed area of the transfer device (infeed roller) temporarily has a higher circumferential speed than the deflection roller at the downstream outfeed area (outfeed roller) of the transfer device, the belt length in the leading strand is increased and the containers are pressed less strongly against the rotary cylinder. Conversely, the belt length in the leading strand is increased if the infeed roller is operated for a short time at a higher circumferential speed than the outfeed roller.

A length of the leading strand of the clamping belt which is too short can be a hindrance if the first containers enter the transfer device on the transport device. If the length of the belt is too short in this case, it may happen that the containers entering the transfer device essentially without back pressure do not reach the transfer device against the belt pressure. In this case, it can be advisable to temporarily increase the belt length in the leading strand by operating the infeed roller faster than the outfeed roller. By controlling the speeds of the deflection rollers it is therefore possible to fine-tune the belt length of the leading strand.

The temporary change of the belt length is also accompanied by a change of the belt tension in the leading strand. In order to reset the belt tension in the leading strand to the original level, the deflection rollers must then be driven in reverse if necessary. In order to compensate for a short-term reduction in belt tension, the infeed roller must therefore be operated slower than the outfeed roller for a short time.

To control the length of the leading strand of the clamping belt, it is advantageous if the required length of the leading strand of the clamping belt changes as little as possible during operation. Situations in which large distances between the containers occur, as well as the first filling and emptying of the transfer device should therefore be avoided as far as possible. One possibility to avoid such situations, especially too large distances between the containers, is to regulate the speed of the conveying-in feeder accordingly. If the container density is relatively low, for example, the infeed speed can be increased in order to close or reduce gaps between the containers.

Another possibility to avoid variations in the required length of the leading strand of the clamping belt is to feed additional containers or container dummies into the container flow, if required. These additional containers or container dummies can be empty containers, for example, which are held in stock on a buffer section arranged parallel to the infeeding first transport section and can be fed into the container flow if required. Any kind of body is suitable as container dummies, whose shape and material is such that they can be integrated into the respective container flow without any problems. However, it must be ensured that the dummy containers are removed from the container flow after the transfer device. Any infeed or outfeed device known to a skilled person can be used for infeeding and outfeeding the additional containers.

In an embodiment in which the transport device has a wrap angle of 180°, the buffer section can, for example, be configured as a circulating feeder, which is arranged parallel and within the transport device. The circulating feeder can be formed by a circulating curved conveyor belt or a rotary table. In the case of the embodiment being a rotary table, for example, it can have a diameter that corresponds to the diameter of the rotary cylinder. The rotary table is preferably arranged offset to the rotary cylinder between the first and the second transport section.

A one-part wedge can be used to integrate the additional containers upstream of the transfer device from the buffer section into the container flow on the first conveying-in transport section of the transport device. Downstream of the transfer device, a one-part wedge can again be provided, with which the additional containers are then diverted from the container flow and returned to the circulating feeder of the buffer section.

Gaps in the container flow can be filled by inserting additional containers or dummy containers. This is especially helpful for those embodiments where the rotary cylinder does not have a support ring and therefore there is a danger of the clamping belt coming into contact with the rotary cylinder. Such situations can also be solved by electronically adjusting the speed of the clamping belt in relation to the circumferential speed of the rotary cylinder. However, a change in the relative speed between the clamping belt and the rotary cylinder also causes the rotation of the containers about their own axis to change. The danger of large gaps in the container flow can be avoided by introducing additional containers. This means that the clamping belt speed can be adjusted at any time independently of the speed of the rotary cylinder.

The additional containers can also be used during commissioning or if operation is interrupted (e.g. at the end of the working day) to ensure constant transport conditions even in these situations. For example, at the end of a container batch, after the last container, one or more of the additional containers or container dummies can be added to the container flow, so that the last container on the transfer device is also transported under identical conditions as the other containers in the container batch. When the additional containers are discharged after the transfer device back to the buffer section, a relatively small number of additional containers is already sufficient to enable continuous transport through the transfer device at any time.

The additional containers can also be test containers, which are used to check inspection devices. Such test containers must be regularly introduced into the container flow to verify the proper functioning of the inspection devices. Normally, gaps in the container flow must be created for the purpose of introducing the test containers, which will affect the production process. According to disclosed embodiments, however, existing gaps in the container flow can be exploited to feed in test containers and thus not only avoid an unintentional contact of the clamping belt with the rotary cylinder, but also to simultaneously check the inspection devices arranged at the transfer device.

Preferably, the containers are held on the curved transport section at least partially exclusively between the clamping belt and the outer circumference of the rotary cylinder.

In this way a container inspection of the transported containers is optimized, since the containers can be inspected from above as well as from below.

Preferably at least one inspection device for container inspection is arranged below and/or above the transport section.

The transport device according to disclosed embodiments can also be advantageously used for leak testing of deformable, filled containers, such as filled plastic bottles or metal cans. For this purpose, a precisely dosed pressure is applied to the containers. If the containers are leaking, the internal pressure is lower while the filling level rises. In order to detect even small leaks, a certain dwell time of the containers in the pressure device must be guaranteed. In the transport device this can be achieved, for example, by holding the containers between the rotary cylinder and the clamping belt for more than just a quarter turn. The pressure can be adjusted in the transport device, for example, by adjusting the belt tension.

Preferably, the first transport section and the second transport section are configured as a continuous conveyor belt, and the curved transport section is configured to transfer the containers suspended between the clamping belt and the outer circumference of the rotary cylinder from the first transport section to the second transport section. In this case, the containers are lifted or guided away from the conveyor belt by the transport device and after passing the curved transport section and performing the container inspection, they are set down or transferred back onto the conveyor belt. The two transport sections can either run in the same direction or be arranged at an angle to each other.

Alternatively, the first transport section and the second transport section are configured as separate conveyor belts. Especially for the leak test it is not necessary that the containers are transported freely suspended at least for a short time. With these embodiments, in addition to being clamped between the clamping belt and the rotary cylinder, the container can also be transported at any time on a continuous conveyor belt that corresponds to the curved transport path of the transfer device.

For the conveyor belt or belts, conventional conveyor belts or link chain conveyors can be used. The containers can be transported on the conveyor belt additionally or exclusively by air cushions or rollers. The conveyor belt can also be configured as a fixed plate, over which the containers are pushed by back pressure.

The transport device according to disclosed embodiments is preferably intended as part of a container inspection device. The container inspection device is configured to inspect containers, preferably containers made of glass or transparent plastics, such as PET. In particular, the containers are glass or PET bottles in the context of a container inspection in the beverage industry. For this purpose, the container inspection device can have further components, especially a radiation source, a detection device and an evaluation device. The radiation source can emit radiation in the direction of the containers to be examined if they are located in the transport device and especially in the curved transport section and are transferred from a first transport section to a second transport section. The radiation passes through the containers to be examined and is then detected by the detection device. The evaluation device evaluates the image detected by the detection device. The radiation source can essentially emit electromagnetic radiation of any wavelength, IR radiation, visible light, UV light or X-ray radiation.

BRIEF DESCRIPTION OF THE DRAWINGS

Various embodiments are illustrated in the drawings, in which.

DETAILED DESCRIPTION

Figure 1:
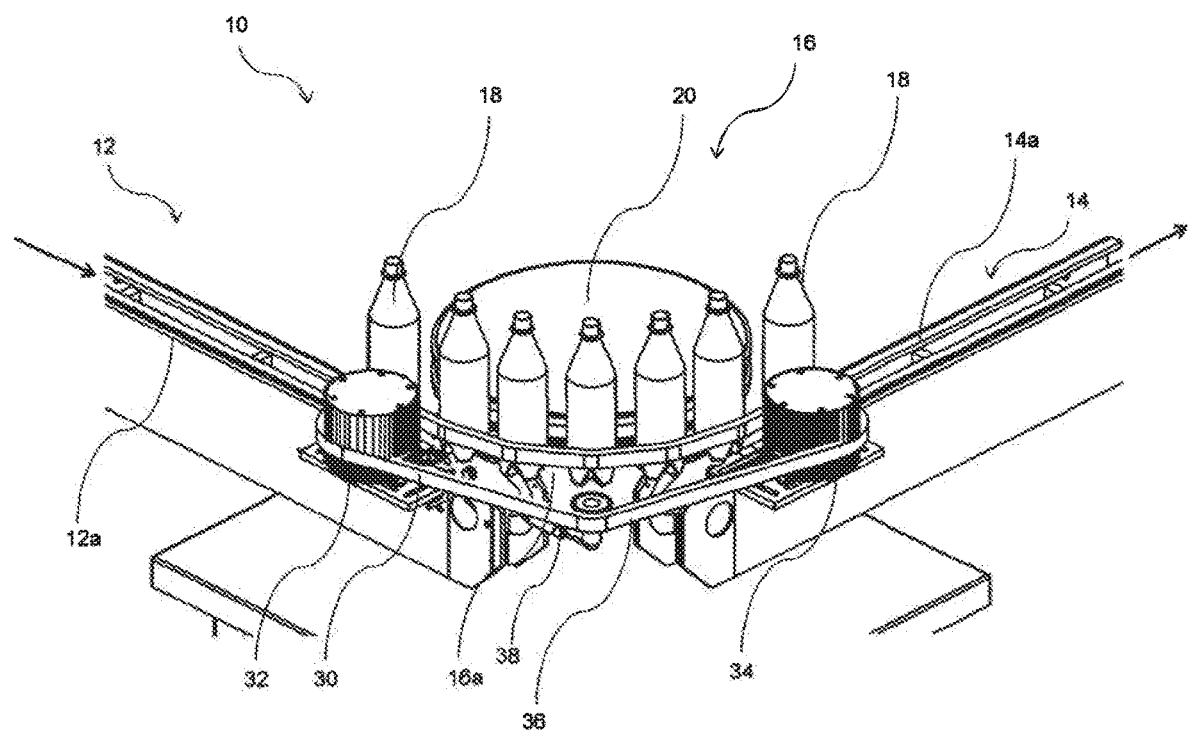
FIG. 1 is a schematic perspective view of the transport device according to an embodiment.
Figure 2:
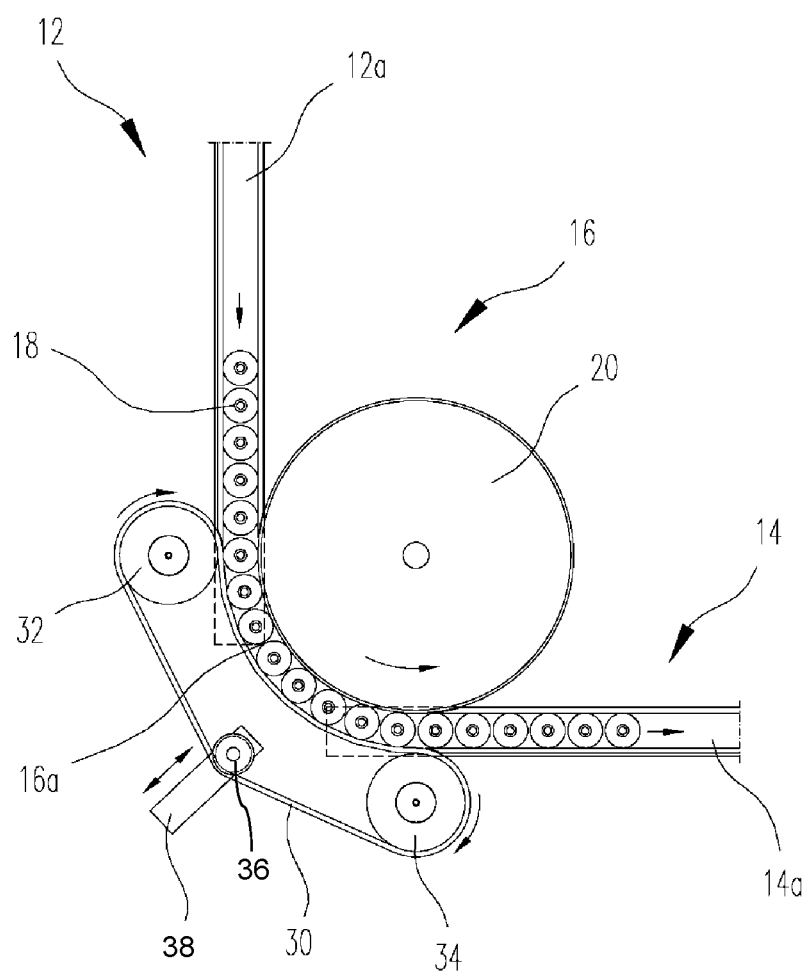
FIG. 2 is a top view of a transport device according to FIG. 1.

FIGS. 1 and 2 show an embodiment of the transport device 10 with a first transport section 12, a second transport section 14 and a transfer device 16. The containers 18 are conveyed in the first transport section 12 on a first feeder 12a in the transport direction indicated by the arrow. At the end of feeder 12a, the containers 18 are transferred to the transfer device 16 and from there to a second feeder 14a in the second transport section 14, offset by 90°.

In the embodiment according to FIGS. 1 and 2, the transfer device 16 comprises a rotary cylinder 20 and a clamping belt 30, each of which is motor-driven via independent drives (not shown).

The clamping belt 30 is tensioned via two deflection rollers 32, 34. The two deflection rollers 32, 34 are each arranged on the circumference of the rotary cylinder 20 in such a way that a conveyed-in container 18 is clamped between the clamping belt 30 and the rotary cylinder 20 at the end of the first transport section 14. The container 18 is then clamped between the rotary cylinder 20 and the clamping belt 30 and transferred by the transfer device 16 to the second feeder 14a offset by 90°. The container 18 is only released again when it is completely above the second feeder 14a and can be safely deposited on it.

Both the deflection roller 32 at the upstream in-feed end of the transfer device 16 and the deflection roller 34 at the downstream out-feed end of the transfer device 16 are motor-driven by independently controlled drive units (not shown).

The clamping belt is an endless belt constructed in two parts. It comprises a polyurethane carrier layer with metal reinforcements, onto which a contact area of the clamping belt consisting of polyurethane is glued. In order to prevent deformation of the clamping belt in the area of the deflectors, the clamping belt has notch-shaped incisions on the front that comes into contact with the containers.

FIGS. 1 and 2 also show a support roller 36 with a compensation element 38, which is used to adjust the effective length of the leading strand of the clamping belt 30. The compensation element 38 is adjusted against the returning strand of the clamping belt 30 with a constant force in a direction pointing away from the containers 18 to be transported or the rotary cylinder 20. If the number of containers 18 transported on the transfer device changes, the length of the leading strand of the clamping belt 30 is readjusted accordingly via the compensation element 38.

Fine tuning of the belt length of the leading strand of the clamping belt 30 can also be achieved during operation by controlling the independent drives of the deflection rollers 32 and 34 differently. The belt length of the leading strand of the clamping belt 30 can be increased by briefly allowing the infeed-side deflection roller 32 to run slightly faster than the outfeed-side deflection roller 34. Conversely, the belt length of the leading strand of the clamping belt 30 is reduced if the infeed-side deflection roller 32 is briefly operated slightly slower than the outfeed-side deflection roller 34.

By means of the clamping belt 30 and the curvature of the rotary cylinder 20, a curved transport section 16a is formed in the area of the transfer device 16, along which the containers 18 to be transported are transported. The rotary cylinder 20 has a cylindrical shape, whereby the outer circumference of the rotary cylinder 20, which contacts the containers 18, is circular or cylindrical.

During transport on the curved transport section 16a of the transfer device 16, the containers 18 are held only by the clamping belt 30 and the rotary cylinder 20, so that the container bottom is freely accessible and can be inspected, for example, by means of an inspection device 40.

Figure 3:
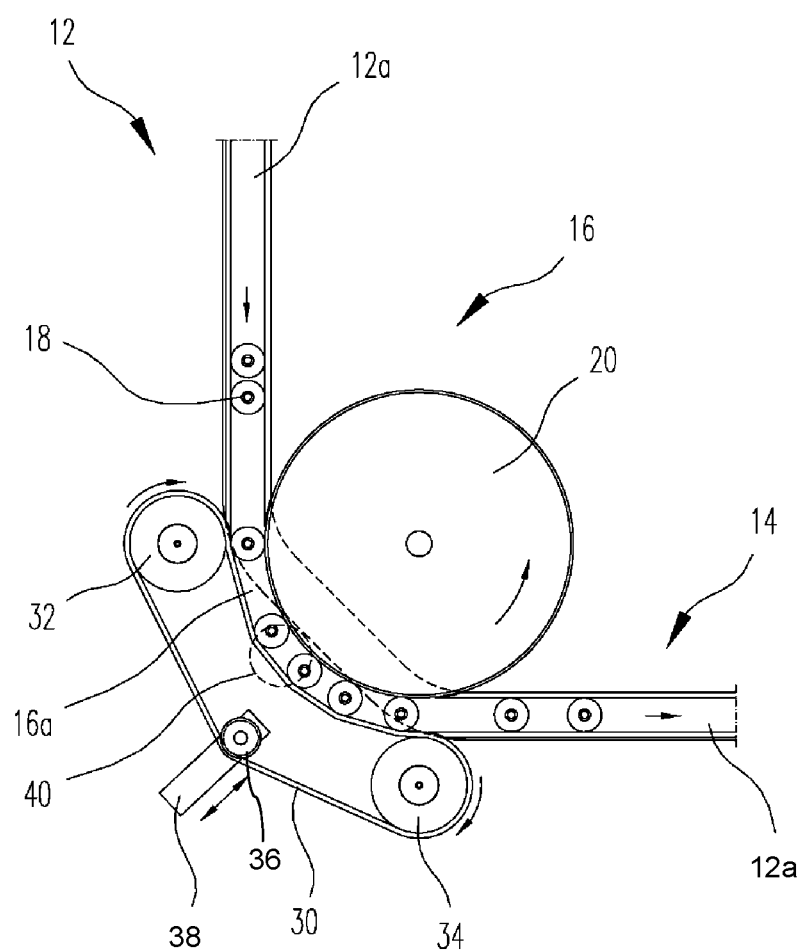
FIG. 3 is a top view of another transport device according to an embodiment.

FIG. 3 shows a top view of a transport device 10 according to an embodiment, which corresponds in large parts to the embodiment according to FIGS. 1 and 2. However, in the embodiment according to FIG. 3, the first transport section 12 and the second transport section 14 are different areas of a single feeder 12a. This feeder 12a defines a narrower curve radius than the rotary cylinder 20, so that the feeder 12a is passed under the rotary cylinder 20 in the area of the transfer device 16. Apart from this, all other components correspond to the components of the transport device 10 according to FIGS. 1 and 2.

Figure 4:
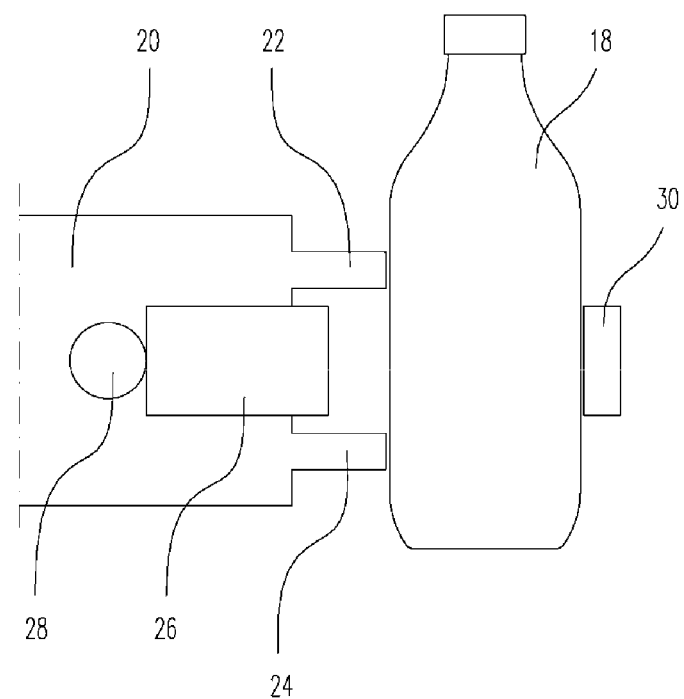
FIG. 4 is a cross-sectional view through a container and the rotary cylinder as well as the clamping belt according to the transport device of an embodiment.

FIG. 4 shows an embodiment of the rotary cylinder 20 as it can be used in the embodiments of the transport devices 10 according to FIGS. 1 and 2. The rotary cylinder 20 has an upper container support ring 22 and a lower container support ring 24. The upper container support ring 22 and the lower container support ring 24 are configured to contact the containers 18 to be transported. A set-back belt support ring 26 is arranged between the upper container support ring 22 and the lower container support ring 24. The set-back belt support ring 26 is freely mounted. The belt support ring is supported by a bearing 28, whereas the upper container support ring 22 and the lower container support ring 24 are driven. Preferably, the upper container support ring 22 and the lower container support ring 24 are connected by a common drive. The common drive can be located inside the rotary cylinder 20 or outside the rotary cylinder 20.

The set-back belt support ring 26 serves to ensure that the clamping belt 30 comes to rest on the set-back belt support ring 26 if no containers 16 are transported in the transport device. The clamping belt 30 has accordingly a width so that the clamping belt 30 does not come into contact with the upper container support ring 22 or the lower container support ring 24 if no containers 18 are transported on the transfer device 16.

Figure 5:
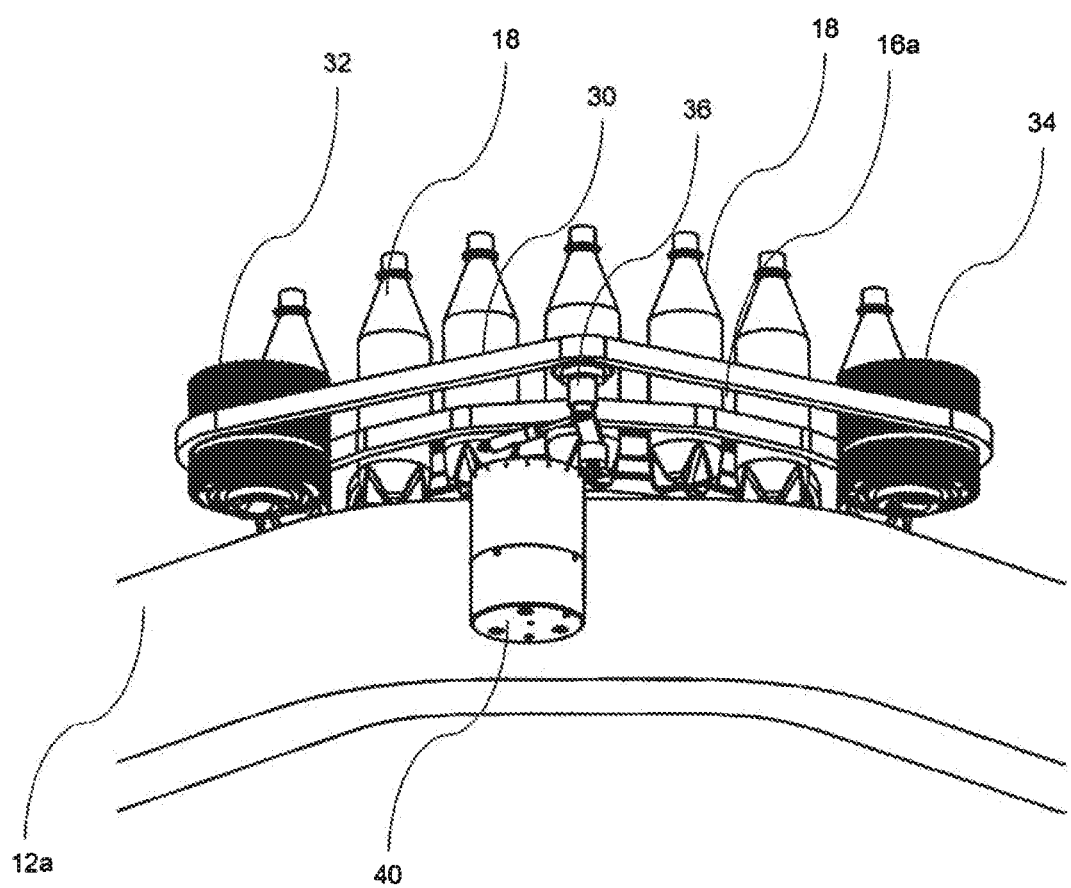
FIG. 5 is a schematic perspective view of the transport device with an inspection device according to an embodiment.

FIG. 5 shows the use of an inspection device 40 with the transport device 10 according to an embodiment. The curved transport section 16a is configured such that containers 18 to be inspected are transferred from a first transport section 12 to a second transport section 14. Between these transport sections 12, 14, the containers 18 are held exclusively between the clamping belt 30 and the rotary cylinder 20.

As indicated in FIG. 5, an inspection device 40 is provided in the area of the transfer device 16 where the container bottom is accessible. This inspection device 40 can be an optical inspection device, for example to check whether the bottom areas of the containers 18 are contaminated or damaged.

Figure 6:
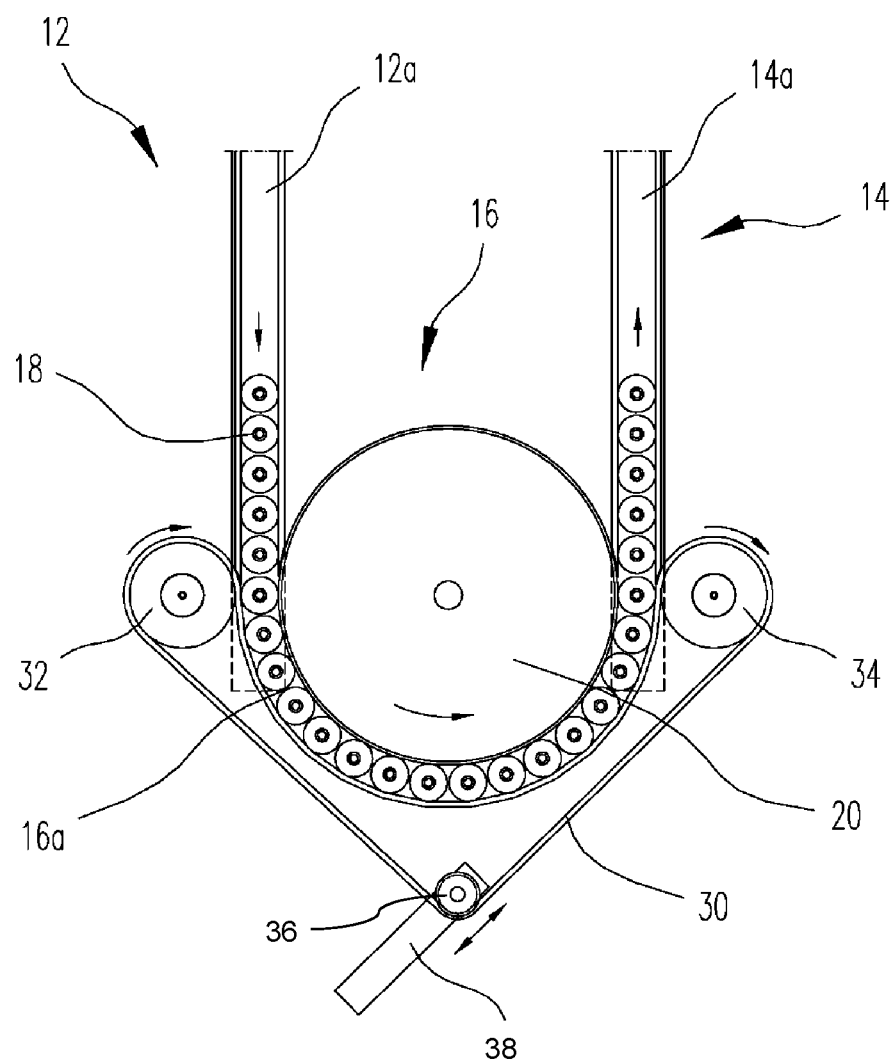
FIG. 6 is a transport device with a wrap angle of 180° according to an embodiment.

FIG. 6 shows a transport device 10, where the first transport section 12 and the second transport section 14 run parallel but in opposite transport directions. The diameter of the rotary cylinder 20 in this design is 50 cm. The clamping belt 30 is again guided over two deflection rollers 32, 34, which are provided at the infeed end and the outfeed end of the transfer device 16. The diameter of the two deflection rollers is 15 cm in this embodiment. In order to prevent the leading strand and the returning strand of the clamping belt 30 from coming into contact and rubbing against each other, the returning strand of the clamping belt 30 is guided over a single support roller 36. The support roller 36 is additionally equipped with a compensation element 38. This embodiment provides a wrap angle of 180°.

Figure 7:
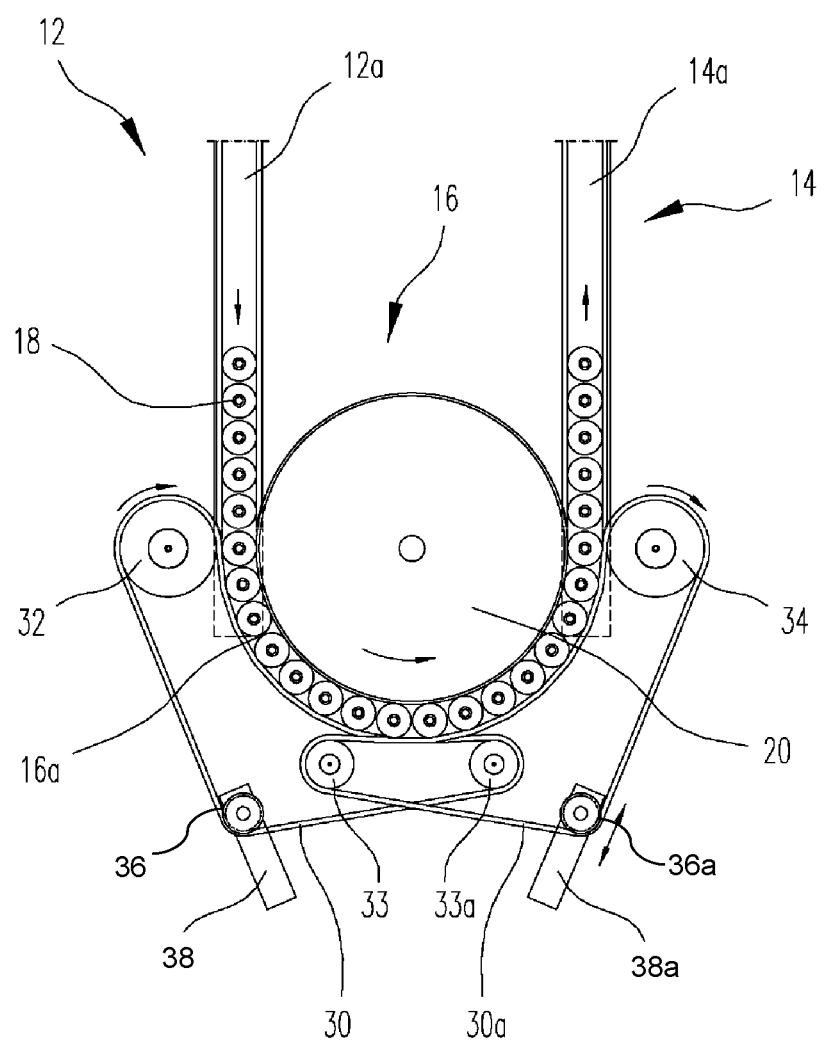
FIG. 7 is another transport device with a wrap angle of 180° according to an embodiment.

FIG. 7 also shows a transport device 10 which provides a wrap angle of 180°. In contrast to the embodiment according to FIG. 6, two clamping belts 30, 30a are provided, one behind the other in the circumferential direction of the rotary cylinder 20. The first clamping belt 30 is guided over the deflection rollers 32, 33 and the support roller 36. The second clamping belt 30*a* is guided over the deflection rollers 34, 33*a* and a support roller 36*a*. The support rollers 36, 36*a* are additionally equipped with a compensation element 38, 38*a* each. The two clamping belts 30, 30*a* are arranged vertically offset to each other so that the containers 18 in the transition area from the first clamping belt 30 to the second clamping belt 30*a* are always pressed firmly against the rotary cylinder 20.

Figure 8:
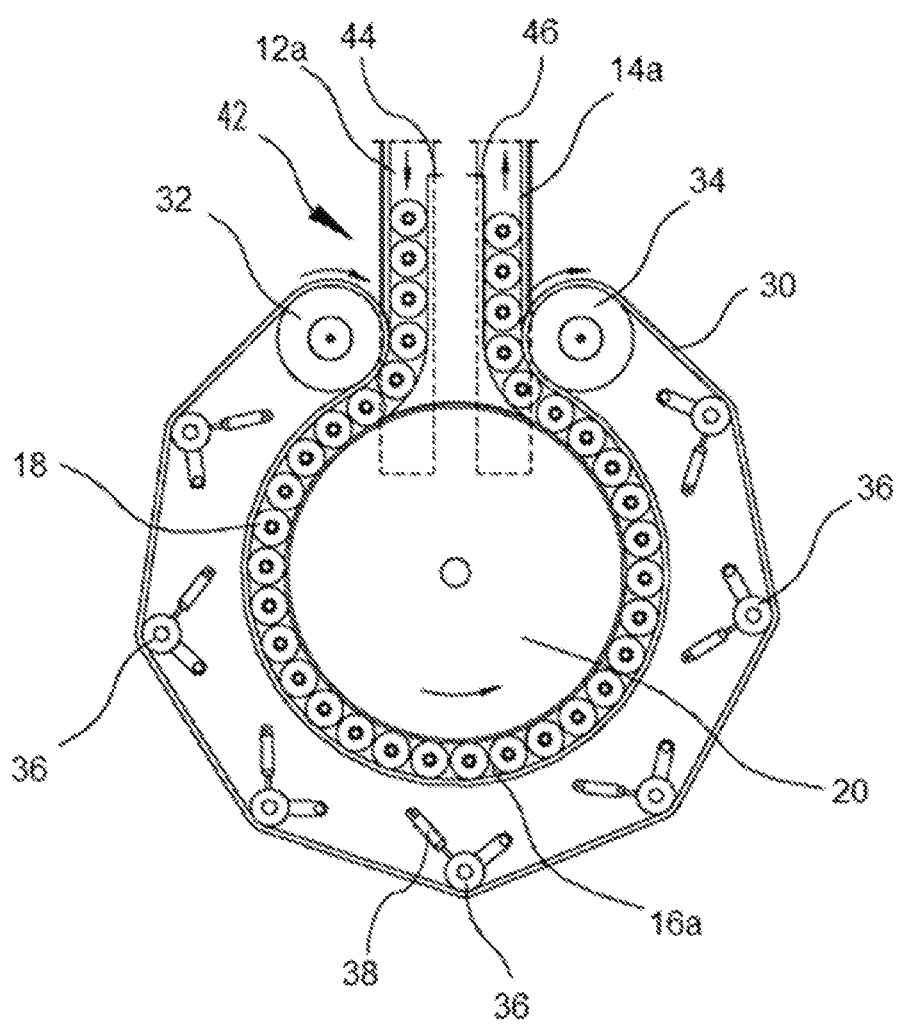
FIG. 8 is a transport device with a wrap angle of about 300°, according to an embodiment.

Finally, FIG. 8 also shows a transport device 10 in which the first transport section 12 and the second transport section 14 run parallel but in opposite transport directions. The clamping belt 30 is again guided over two deflection rollers 32, 34, which are provided at the infeed end 42 and at the outfeed end of the transfer device 16.

In this embodiment, the wrap angle is about 330° of the circumference of the rotary cylinder 20. To prevent the clamping belt 30 from rubbing on itself, the returning strand of the clamping belt 30 is guided over several support rollers 36. In the present embodiment, all support rollers 36 also have a compensation element 38 for adjusting the length of the leading strand of the clamping belt 30. However, it is also possible that only one or only some of the support rollers 36 have a compensation element 38.

A guide plate 44 is provided at the infeed end 42 of the transfer device 16. The containers 18 are clamped there between the guide plate 44 and the clamping belt 30 and then pressed by the clamping belt 30 to the rotary cylinder 20.

The containers 18 remain at the rotary cylinder 20 for almost one complete revolution and are pressed by the clamping belt 30 to the rotary cylinder 20. At the outfeed, the containers 18 are again guided along a guide plate 46 away from the rotary cylinder 20 and transferred to a transport device 14*a*.

Figure 9A:
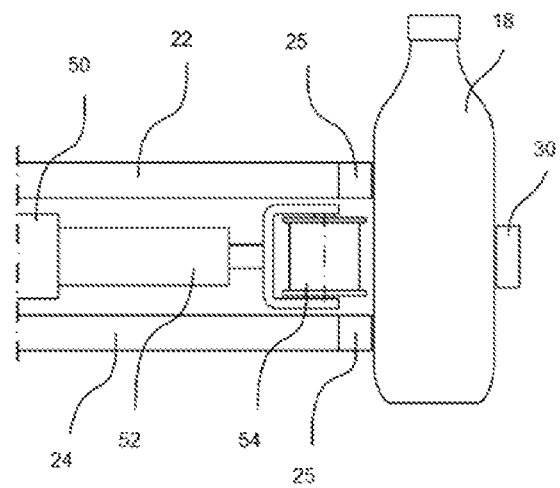
FIGS. 9a and 9b are cross-sectional views through a container and a rotary cylinder with support device according to another embodiment.
Figure 9B:
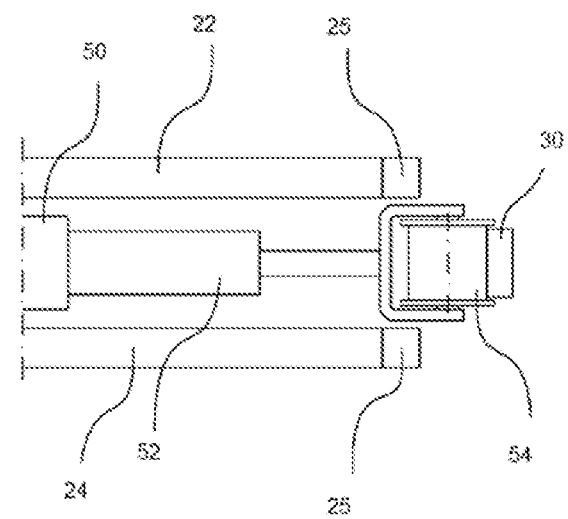

FIGS. 9*a* to 11 show a transport device 10 according to an embodiment, which largely corresponds to the device shown in FIG. 6. In this embodiment, the rotary cylinder 20 does not comprise a belt support disk 26 but three support devices 50, each comprising a belt support roller 54 and an adjusting element 52. Cross sections are shown in FIG. 9*a* and FIG. 9*b*. The support devices 50 are arranged in a fixed position and therefore do not rotate with the rotary cylinder 20. The adjusting elements 52 are each configured in such a way that they can move the associated belt support roller 54 steplessly between a first position and a second position in a radial direction relative to the axis of rotation of the rotary cylinder 20. In the first position shown in FIG. 9*a*, the adjusting element 52 is retracted and the respective belt support roller 54 is located completely within the circumferential range of the rotary cylinder 20. As shown in FIG. 9*a*, in this position, a container 18 can be transported clamped between the running surface 25 of the container support rings 22, 24 and the clamping belt 30. In the second position, as shown in FIG. 9*b*, the adjusting element 52 is extended and at least one circumferential area of the respective belt support roller 54 extends radially beyond the circumferential area of the rotary cylinder 20. In this position, the clamping belt 30 is guided over the belt support roller 54 so that contact between the clamping belt 30 and the rotary cylinder 20 is avoided.

Figure 10:
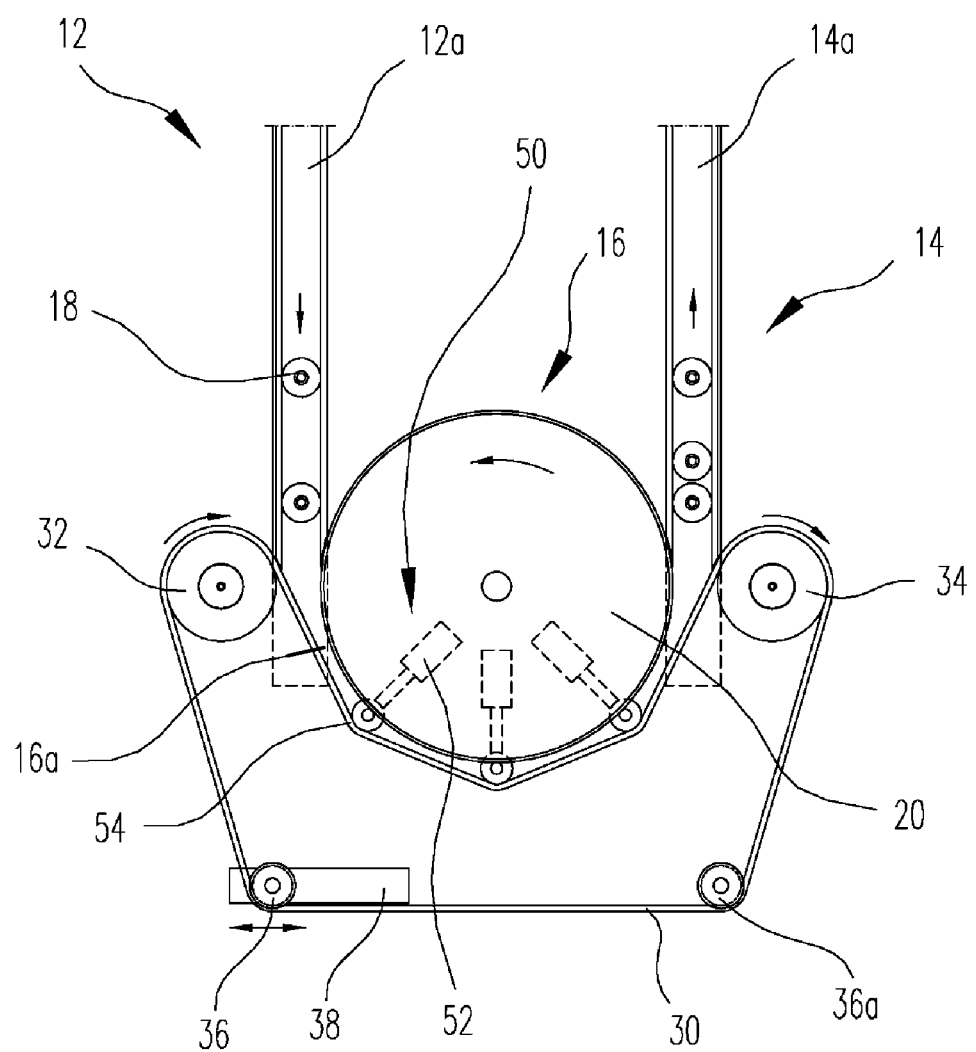
FIG. 10 is a top view of the transport device according to the embodiment in FIGS. 9a and 9b, without container.

FIG. 10 shows this embodiment in a top view, with no containers 18 on the transfer device 16 yet. All support devices 50 are extended and the clamping belt 30 runs over all three belt support rollers 54 without touching the rotary cylinder 20. The length of the leading strand of the clamping belt 30 in this embodiment is approximately as long as the required length of the leading strand of the clamping belt 30 for a completely filled transfer device 16, even if the transfer device 16 is empty. For this reason, only a relatively small length adjustment of the leading strand of the clamping belt 30 is necessary if the first containers 18 enter the transfer device 16 or the last containers 18 leave the transfer device 16.

Figure 11:
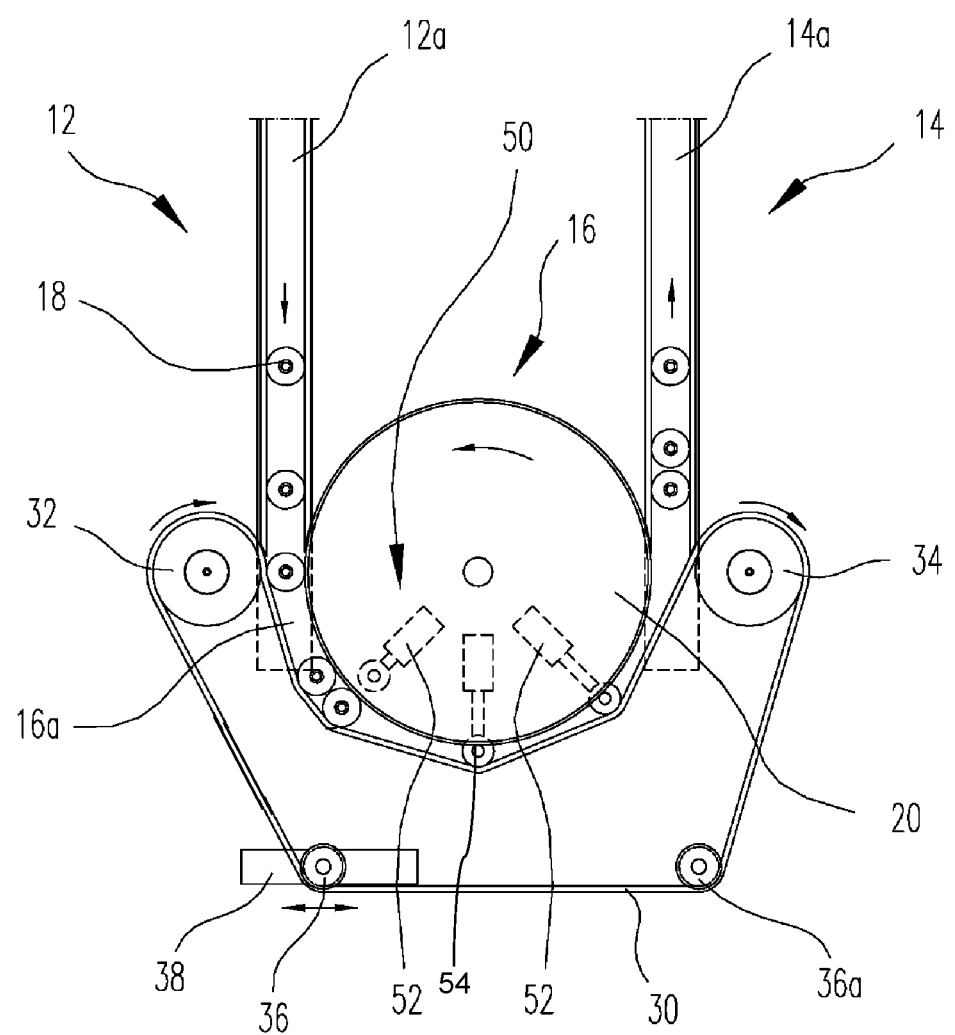
FIG. 11 is a transport device according to FIG. 10, where there are already containers between clamping belt and rotary cylinder.

In the drawing in FIG. 11, some of the containers 18 are already on the transfer device 16. The first support device 50 in the infeed area of the transfer device 16 is already retracted to allow the conveyed-in containers 18 to pass through. In this area, the clamping belt 30 is already guided over the containers 18 on the transfer device 16 so that undesired contact with the rotary cylinder 20 is avoided here. The other two support devices 50 are still extended, since there are no containers 18 in this area yet. The extended support devices 50 prevent the clamping belt 30 from coming into contact with the rotary cylinder 20 in this area. One of the support rollers 36 is equipped with a compensation element 38 to adjust the length of the leading strand of the clamping belt 30.

Figure 12:
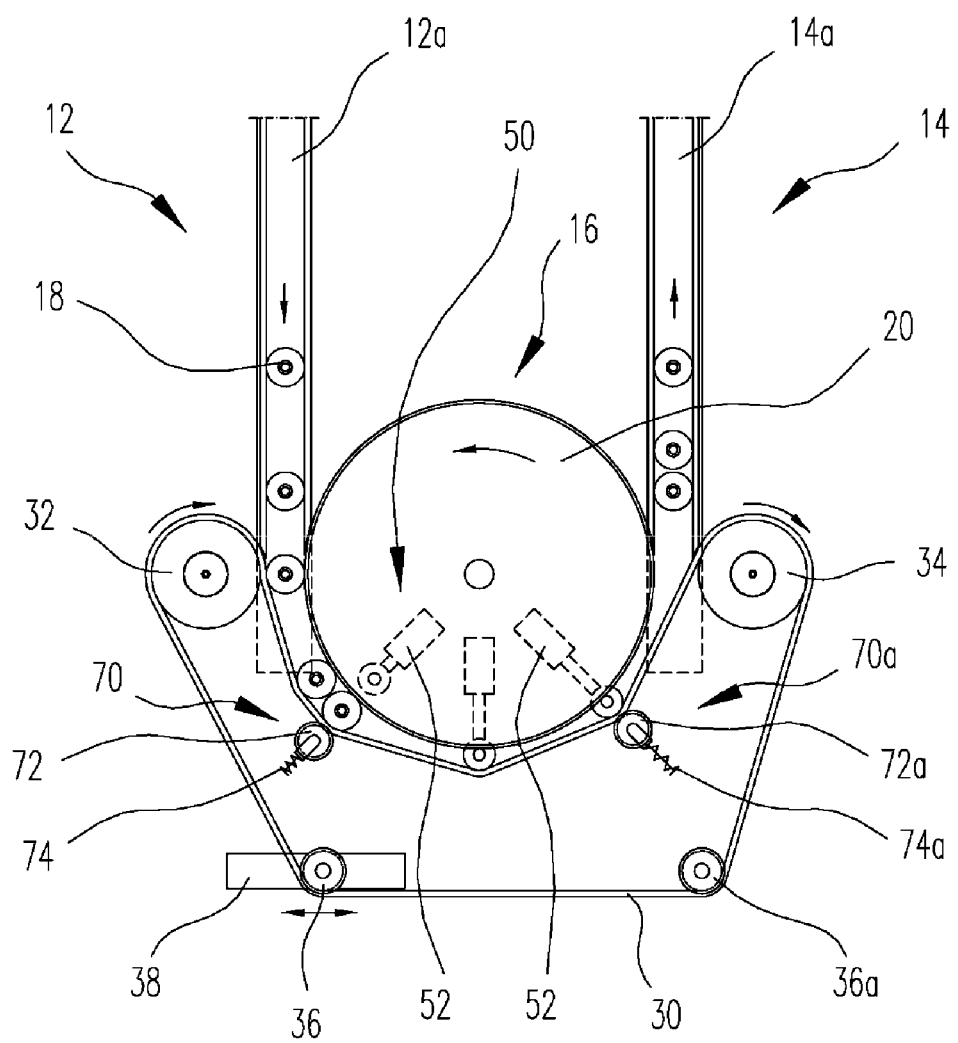
FIG. 12 is a transport device according to FIGS. 9a to 11 with additional guiding device.

The embodiment according to FIG. 12 essentially corresponds to the embodiment according to FIGS. 9 to 11, but FIG. 12 provides a guiding device 70 to stabilize the vertical course of the leading strand of the clamping belt 30. The guiding device 70 consists of two guide rollers 72, 72*a*, each of which is pretensioned against the rear side of the leading strand of the clamping belt 30 by means of an associated adjusting device 74, 74*a*. The guide rollers 72, 72*a* each have the shape of a cylindrical disk spool and have protruding boundaries at the front sides between which the clamping belt is guided. By means of the adjusting devices 74, 74*a*, it is ensured that each guide roller 72, 72*a* always follows the current position of the clamping belt 30 and thus always rests against the back of the leading strand of the clamping belt 30.

In FIG. 12, for example, in the area of the guide rollers 72, there are already some containers 18 on the transfer device 16. The clamping belt 30 runs over the outer circumference of these containers 18 and the guide roller 72 is positioned via its associated adjusting device 74 in such a way that the guide roller 72 is in contact with the rear side of the leading strand of the clamping belt 30. The clamping belt 30 is guided through the protruding boundaries at the face ends of the guide roller 72. In the area of the guide roller 72*a*, however, there are no containers on the transfer device 16. In this case, the clamping belt 30 runs directly over the belt support roller 54 provided in this area. The adjusting device 72*a* ensures that the guide roller 72*a* still rests against the rear side of the leading strand of the clamping belt 30 and guides it on its specified vertical position. To adjust the length of the leading strand of the clamping belt 30, one of the support rollers 36 is again provided with a compensation element 38.

Figure 13:
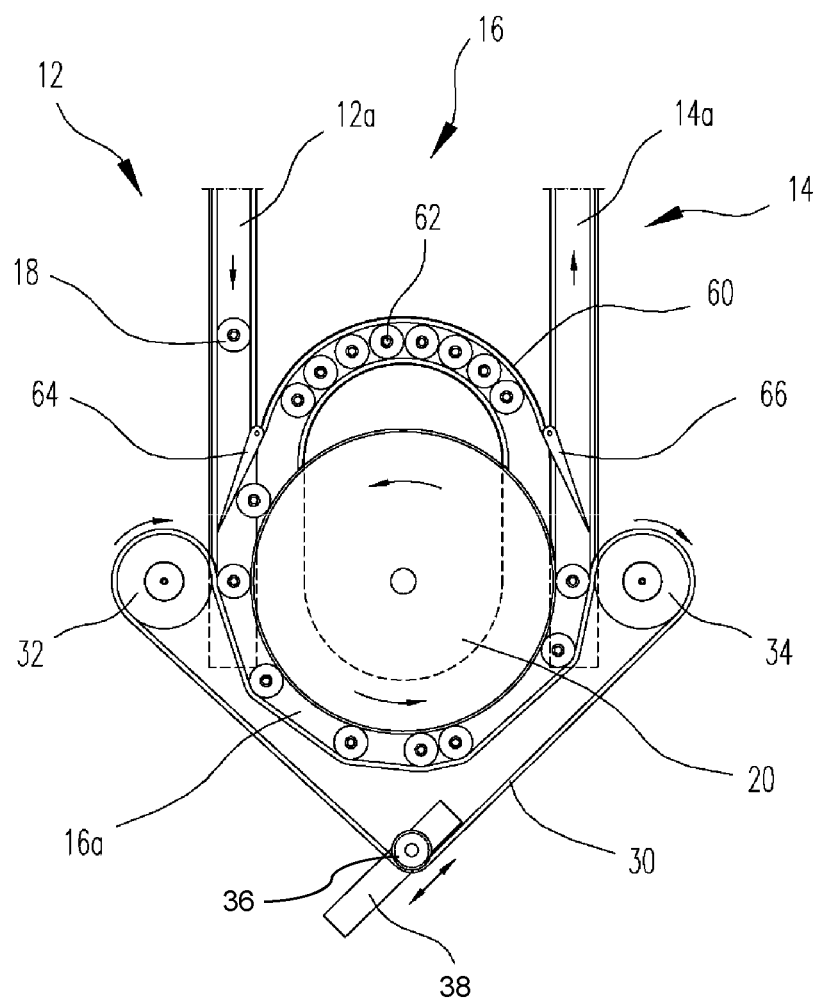
FIG. 13 is a transport device according to FIG. 6 with a buffer section.

FIG. 13 concerns a modification of the transport device 10 according to the embodiment of FIG. 6, wherein the modification consists in the fact that an additional buffer section in the form of a circulating feeder 60 is provided, which is arranged inside and parallel to the two feeders 12*a* and 14*a*. Additional containers 62 are provided on the circulating feeder 60, which, if required, can be fed into the container stream of the first feeder 14*a* via a infeed device 64. Downstream of the transfer device, a outfeed device 66 is provided, by means of which the additional containers 62 can be separated from the container stream again and returned to the circulating feeder 60. In the illustrated embodiment, the infeed and outfeed devices 64, 66 are each formed by an one-part wedge. Of course, any discharge device known to the skilled person can be used for this purpose.

The disclosure is not limited to the described embodiments, but results from the combination of the features described above.

LIST OF REFERENCE NUMBERS 10 transport device
12 first transport section
12a first feeder
14 second transport section
14a second feeder
16 transfer device
16a curved transport section
18 container
20 rotary cylinder
22 upper container support ring
24 lower container support ring
25 running surface
26 belt support ring
28 bearing
30 clamping belt
30a clamping belt
32 deflection roller/infeed roller
34 deflection roller/outfeed roller
33 deflection roller
33a deflection roller
36 support roller
36a support roller
38 compensation element
38a compensation element
40 inspection device
42 in-feed end
44 guide plate
46 guide plate
50 support device
52 adjusting element
54 belt support roller
60 circulating feeder
62 additional containers
64 in-feed device
66 outfeed device
70 guiding device
72 guide roller
72a guide roller
74 adjusting device
74a adjusting device

The invention claimed is:

1. A transport device for transporting containers, comprising:
   a first transport section which is configured to convey the containers in,
   a second transport section, which is configured to convey the containers out, and
   a transfer device comprising
      a rotary cylinder,
      a clamping belt, and
      a compensation device,
   wherein the rotary cylinder and/or the clamping belt are configured to be drivable, wherein the compensation device is configured in such a way that the length of the clamping belt can be adjusted with it in the region of the transfer device,
   wherein the rotary cylinder and the clamping belt are configured to hold the containers between the rotary cylinder and the clamping belt while transferring them from the first transport section to the second transport section,
   wherein the rotary cylinder comprises one or more container support rings and at least one belt support element, and
   wherein the belt support element is arranged such that the clamping belt abuts against it when there are no containers on the transfer device.

2. The transport device according to claim 1, wherein the rotary cylinder and the clamping belt are configured to be drivable, and wherein the rotary cylinder and the clamping belt are configured to be drivable at different speeds.

3. The transport device according to claim 1, wherein the clamping belt runs around two deflection rollers.

4. The transport device according to claim 1, wherein both deflection rollers are provided with drives being independent of each other.

5. The transport device according to claim 1, whereby both deflection rollers are provided with external rotor motors which are independent of each other.

6. The transport device according to claim 1, wherein the belt support element of the rotary cylinder comprises at least one freely rotatably mounted belt support ring, and wherein the belt support ring is arranged such that the clamping belt abuts against it when there are no containers on the transfer device.

7. The transport device according to claim 1, wherein the belt support element of the rotary cylinder comprises one or more extendable support devices over which the clamping belt is guided when there are no containers on the transfer device.

8. The transport device according to claim 1, wherein the containers are held from the first transport section to the second transport section on a curved transport section and are held at least in some areas exclusively between the clamping belt and the rotary cylinder.

9. The transport device according to claim 1, wherein at least one inspection device for container inspection is arranged below and/or above the curved transport section.

10. The transport device according to claim 1, wherein the first transport section and the second transport section are configured as a continuous transport belt, and the curved transport section is configured to transfer the containers kept suspended between the clamping belt and the rotary cylinder from the first transport section to the second transport section of the transport belt.

11. A method for transporting containers comprising the steps of:
   conveying the containers in on a first transport section,
   transferring the containers by means of a transfer device from the first transport section to a second transport section,
   conveying the containers out on the second transport section, wherein the transfer device comprises a rotary cylinder and a clamping belt,
   wherein the rotary cylinder and/or the clamping belt are configured to be drivable,
   wherein the available length of the clamping belt is adjustable in the region of the transfer device by means of a compensation device,
   wherein the rotary cylinder and the clamping belt are configured to hold the containers between the rotary cylinder and the clamping belt during the transfer,
   wherein the rotary cylinder comprises one or more container support rings and at least one belt support element, and wherein the belt support element is arranged such that the clamping belt abuts against it when no containers are on the transfer device.

12. The method according to claim 11, wherein the clamping belt is guided over two deflection rollers and wherein both deflection rollers are configured to be drivable with drives being independent of one another.

13. The method according to claim 12, whereby the length of the leading strand of the clamping belt can also be adjusted by briefly varying the speed of the deflection rollers.

14. The method according to claim 1, whereby the speed of the clamping belt is adapted to the circumferential speed of the rotary cylinder by means of an electronic control.

* * * * *